(12) United States Patent
Moore et al.

(10) Patent No.: US 10,769,444 B2
(45) Date of Patent: Sep. 8, 2020

(54) OBJECT DETECTION FROM VISUAL SEARCH QUERIES

(71) Applicant: AIQ PTE. LTD, Singapore (SG)

(72) Inventors: Stephen Maurice Moore, Singapore (SG); Larry Patrick Murray, Singapore (SG); Rajalingappaa Shanmugamani, Singapore (SG)

(73) Assignee: GOH SOO SIAH, Singapore (SG)

( * ) Notice: Subject to any disclaimer, the term of this patent is extended or adjusted under 35 U.S.C. 154(b) by 0 days.

(21) Appl. No.: 16/331,330

(22) PCT Filed: Sep. 7, 2017

(86) PCT No.: PCT/SG2017/050449
§ 371 (c)(1),
(2) Date: Mar. 7, 2019

(87) PCT Pub. No.: WO2018/048355
PCT Pub. Date: Mar. 15, 2018

(65) Prior Publication Data
US 2019/0362154 A1 Nov. 28, 2019

Related U.S. Application Data

(60) Provisional application No. 62/384,855, filed on Sep. 8, 2016.

(51) Int. Cl.
*H04N 21/478* (2011.01)
*G06K 9/00* (2006.01)
(Continued)

(52) U.S. Cl.
CPC ..... *G06K 9/00718* (2013.01); *G06F 16/7837* (2019.01); *G06F 16/951* (2019.01);
(Continued)

(58) Field of Classification Search
CPC .......... H04N 21/47815; H04N 21/812; H04N 21/44008; G06K 9/00765; G06K 9/00758;
(Continued)

(56) References Cited

U.S. PATENT DOCUMENTS 8,213,916 B1 * 7/2012 Yankovich ............ H04L 65/602
455/414.3
8,595,773 B1 * 11/2013 Wang ..................... G06Q 30/06
705/26.1
(Continued)

FOREIGN PATENT DOCUMENTS

CN 102063436 A 5/2011
CN 104715023 A 6/2015
(Continued)

OTHER PUBLICATIONS

European Search Report for corresponding application EP17849212; dated Jan. 16, 2020.
(Continued)

*Primary Examiner* — Nasser M Goodarzi
*Assistant Examiner* — Patrick A Ryan
(74) *Attorney, Agent, or Firm* — Cantor Colburn LLP

(57) ABSTRACT

This invention includes a system and method of populating a data-base with known objects. The database can be populated with off-line data augmentation (e. g. a web crawler) or by aligning known objects and metadata clusters with defined content. A viewer can query images from live or offline media. Objects in the viewers query are linked with similar objects or recommended products in the database.

11 Claims, 6 Drawing Sheets

(51) Int. Cl.
G06F 16/783 (2019.01)
G06F 16/951 (2019.01)
G06N 3/04 (2006.01)
G06N 3/08 (2006.01)
G06Q 30/02 (2012.01)
H04N 21/44 (2011.01)
H04N 21/81 (2011.01)
H04N 21/858 (2011.01)

(52) U.S. Cl.
CPC ..... *G06K 9/00744* (2013.01); *G06K 9/00758* (2013.01); *G06K 9/00765* (2013.01); *G06N 3/04* (2013.01); *G06N 3/08* (2013.01); *G06Q 30/0277* (2013.01); *H04N 21/44008* (2013.01); *H04N 21/47815* (2013.01); *H04N 21/812* (2013.01); *H04N 21/858* (2013.01)

(58) Field of Classification Search
CPC ........... G06K 9/00744; G06K 9/00718; G06Q 30/0277; G06N 3/08; G06N 3/04; G06F 16/951
See application file for complete search history.

(56) References Cited

U.S. PATENT DOCUMENTS

| | | | | |
|---|---|---|---|---|
| 10,440,435 B1* | 10/2019 | Erdmann | ......... | H04N 21/42224 |
| 2008/0177640 A1* | 7/2008 | Gokturk | ............ | G06Q 30/0603 |
| | | | | 705/26.62 |
| 2011/0082735 A1 | 4/2011 | Kannan | | |
| 2011/0103763 A1* | 5/2011 | Tse | .................... | H04N 5/44543 |
| | | | | 386/201 |
| 2013/0016899 A1* | 1/2013 | Li | ........................ | G06K 9/6201 |
| | | | | 382/159 |
| 2013/0016910 A1* | 1/2013 | Murata | .............. | H04N 21/8583 |
| | | | | 382/195 |
| 2013/0282532 A1* | 10/2013 | Shihadah | ........... | H04N 21/8352 |
| | | | | 705/27.1 |
| 2014/0100993 A1* | 4/2014 | Farmer | .............. | G06Q 30/0277 |
| | | | | 705/27.1 |
| 2014/0215529 A1* | 7/2014 | Good | ................. | H04N 21/2542 |
| | | | | 725/60 |
| 2014/0337174 A1 | 11/2014 | Lin | | |
| 2015/0067739 A1* | 3/2015 | Kelley | ............. | H04N 21/47205 |
| | | | | 725/60 |
| 2015/0296250 A1 | 10/2015 | Casper | | |
| 2017/0132468 A1* | 5/2017 | Mosher | ................ | G06K 9/6269 |
| 2017/0171621 A1* | 6/2017 | Zhu | ........................ | H04N 21/84 |
| 2017/0372165 A1* | 12/2017 | Jouhikainen | ......... | G06K 9/4609 |

FOREIGN PATENT DOCUMENTS

| | | |
|---|---|---|
| CN | 103020172 A | 8/2015 |
| CN | 104967885 A | 10/2015 |
| CN | 105373938 A | 3/2016 |
| WO | 2016137389 A1 | 9/2016 |

OTHER PUBLICATIONS

International Search Report for corresponding application PCT/SG2017/050449 filed Mar. 15, 2018; dated Nov. 15, 2017.
International Preliminary Report on Patentability for corresponding application PCT/SG2017/050449 filed Mar. 15, 2018; dated Aug. 20, 2018.

* cited by examiner

OBJECT DETECTION FROM VISUAL SEARCH QUERIES

FIELD OF THE INVENTION

The invention relates to computer technology for Internet marketing, and more specifically, to a networked computerized application, to break up video into segments, identify objects in the segments and match products with the objects.

BACKGROUND OF THE INVENTION

E-commerce is a transaction of buying or selling online. E-commerce has become an important tool for businesses worldwide, not only to sell to customers, but also to engage them. In 2012, worldwide e-commerce sales exceeded $1 trillion.

Internet marketing refers to advertising and marketing efforts that use the Web and e-mail to drive sales via ecommerce. It includes e-mail marketing, search engine marketing (SEM), social media marketing, many types of display advertising (e.g. banner advertising) and mobile advertising. Metadata is a vital component of Internet marketing.

Because online shoppers are unable to view items in person, they usually search by criteria such as a keyword. Businesses routinely store metadata about searches and transactions which enables them to analyze sales trends, develop marketing plans and make predictions. This same metadata allows businesses to provide a more personalized shopping experience with features such as purchase history, address books for multiple shipping locations, and product recommendations.

Today, most web pages have metadata embedded in them. Web search engines build up vast indexes that use page text and its attendant metadata to provide relevant search results to users. Metadata can be used for targeted advertising. Advertisers can use sophisticated methods to target the most receptive audiences with certain traits, based on the product the advertiser is promoting.

For example, a person could use a web browser to search for airline flights to New Zealand. Metadata in the form of "cookies" from websites visited by him/her is stored on the computer by a user's web browser. Cookies are sent back and forth between an internet server and the browser which allows the user to be identified and/or to track his/her activities. Thereafter, the person could receive advertisements such as banner ads related to travel in New Zealand such as hotel, car rental, tour and flight information.

Further, metadata can be used to identify and target a user based on demographics. A business may recognize that a product appeals to a certain demographic and direct marketing efforts toward that demographic. For example, a banner advertisement for investment securities may be ineffective for a teenage audience. Targeting the advertisement to an older demographic, and more particularly to those seeking retirement, will be more effective. The user will not receive advertisements if metadata suggests that he/she is outside the target demographic.

With the advent of a market demonstrating an increasing uptake in visual search use-cases, enrichment of demographic profiling is of great interest and benefit to consumers as well as the company. Organizations may use such models to provide highly personalized offerings, estimate usage patterns (based on seasonality for example), and even scope future product direction.

Visual based searches are common, particularly with the ubiquity of smart phones and tablet computers. For example, the user in the example above might seek images related to hiking and trekking in New Zealand. Because he/she clicks on images, the browser is unable to record metadata based on keywords typed into the browser. Similarly, he/she may watch video related to attractions in New Zealand. With conventional technology, neither the images nor the video will contribute metadata for targeted marketing.

However, increase video streaming and downloading also presents new opportunities. For example, a popular celebrity may appear in a video on social media carrying a particular handbag. Sales of the handbag can proliferate if it is identifiable to and available for purchase.

Given the proliferation and popularity of Internet based video distribution platforms of various architectures, visual search on video content has the potential to tap in to a multi-million user base consisting of content creators, consumers and commercial partners. If specific segments of a video can be identified, interested parties gain the ability to augment and/or partner these sections with additional content. This may take the form of information enrichment for such sections. Commercial partners may wish to target relevant sections as avenues to distribute product offerings.

Further, marketers are seeking improved methods to engage younger audiences used to ad-skipping and on-demand media usage. Product placement and branded entertainment provides "omni-channel" possibilities to more effectively engage younger and/or tech-savvy consumers.

This presents a problem to the advertiser. There is currently no way for a viewer to express interest in an object or product that he/she views in a show or scene. For example, a viewer can see a celebrity with a handbag. However, it may not be apparent where to purchase the handbag. The viewer will not search for the handbag and will gradually lose interest. Attempts have been made to link video and/or print to a website.

Using current technology, a vendor or advertiser can include a QR code (Quick Response Code) on a print or video advertisement. A viewer can use a smartphone to scan the QR code which will direct him/her to a website and/or web content. However, this requires a conspicuous block of code to be placed in proximity of the viewer. Further, a separate QR code must be included for each object of interest. For a video, the QR code must be present for its entire duration.

Accordingly, there is a need for a method of allowing a viewer to express interest and/or gain additional information related to objects on images and/or video. The system should allow a user to obtain details and further information on subject matter without conducting a keyword search or scanning a QR code. It should be capable of use with print media (e.g. magazine advertisements) as well as video media (e.g. television).

INTRODUCTION

The invention includes a method of detecting an object in video and matching the object to one or more products comprising the steps of (a) obtaining video, (b) segmenting the video based on depicted settings and/or events by comparing contents of consecutive frames for similarities and differences, (c) compiling segments of same or similar settings and/or events, (d) analyzing one or more frames of the video to detect one or more objects from each segment of same or similar settings and/or events, (e) comparing the one or more objects to products in a database, (f) identifying products associated with the one or more objects and (g) notifying one or more viewers of the products.

The method can use a convolutional neural network (CNN) to identify products associated with the one or more objects. The database can be populated with off-line data augmentation (web crawler) and/or by aligning known objects and metadata clusters with defined content. A second screen content augmentation can be used for live or streaming video. The step of notifying one or more viewers or the products can include displaying an advertisement and/or notifying one or more viewers or the products by providing a hyperlink to a website or video.

The invention also includes a method of detecting one or more objects in a screen shot and matching the one or more objects to promotional material comprising the steps of (a) receiving an inquiry from a viewer in the form of a digital image or screen shot, (b) identifying one or more articles in the screen shot, (c) comparing the one or more articles to products in a database, (d) identifying products associated with the one or more articles and (e) contacting the viewer with promotional material related to the identified products.

The database can be populated with products by off-line data augmentation (web crawler) and/or by aligning known objects and metadata clusters with defined content. A second screen content augmentation can be used for live or streaming video. The step of contacting the viewer with promotional material can include displaying an advertisement and/or providing a hyperlink to a website or video.

The invention also includes a system for generating relationships between objects in video to products in a database and distributing information on products comprising (a) a computerized network and system to be locally or remotely exposed to a user or groups of users via a user interface application such as mobile, browser or any similar computerized system, (b) a module for detecting and storing media content locally or on a server, (c) a module for transmitting the media content to a processor, remote or server-based, for ingestion of metadata and/or visual features, (d) a module for transmitting the media content to a processor, remote or server-based, for extraction of metadata and/or visual features, (e) a means for receiving input from one or more viewers in the form of a digital image that includes visual features, (f) a module configured to identify the visual features and correlate the visual features with objects and/or groups of related products and (g) a networked service that distributes information on the objects and/or groups of related products to a user and/or groups of users.

A convolutional neural network (CNN) can be used to analyze visual features and metadata to correlate the visual features with objects and/or groups of related products. The database can be populated with known objects using off-line data augmentation (web crawler) and/or by aligning known objects and metadata clusters with defined content. The information on the related products includes advertisements and/or a hyperlink to access content through the internet.

SUMMARY OF THE INVENTION

A first aspect of the invention is a system to generate relationships between user visual queries and detected objects from within a corpus of object databases.

A second aspect of the invention is a computerized network and system to be locally or remotely exposed to a user or groups of users via a user interface application such as mobile, browser or any similar computerized system.

A third aspect of the invention is a module configured to detect and store media content locally or on a server.

A fourth aspect of the invention is a module configured to transmit media content to a processor, remote or server-based, for ingestion and extraction of relevant metadata and/or visual features.

A fifth aspect of the invention is a computer model for analyzing the visual features and metadata to correlate with specific objects and/or groups of objects.

A sixth aspect of the invention is a module hosted locally or server-side, configured for linking detected objects to groups of related objects.

A seventh aspect of the invention is a module hosted locally or server-side, configured for aligning known objects and metadata clusters to pre-defined content.

An eighth aspect of the invention is a networked service that distributes content to a user and/or groups of users.

DETAILED DESCRIPTION OF THE INVENTION

Definitions

Figure 1:
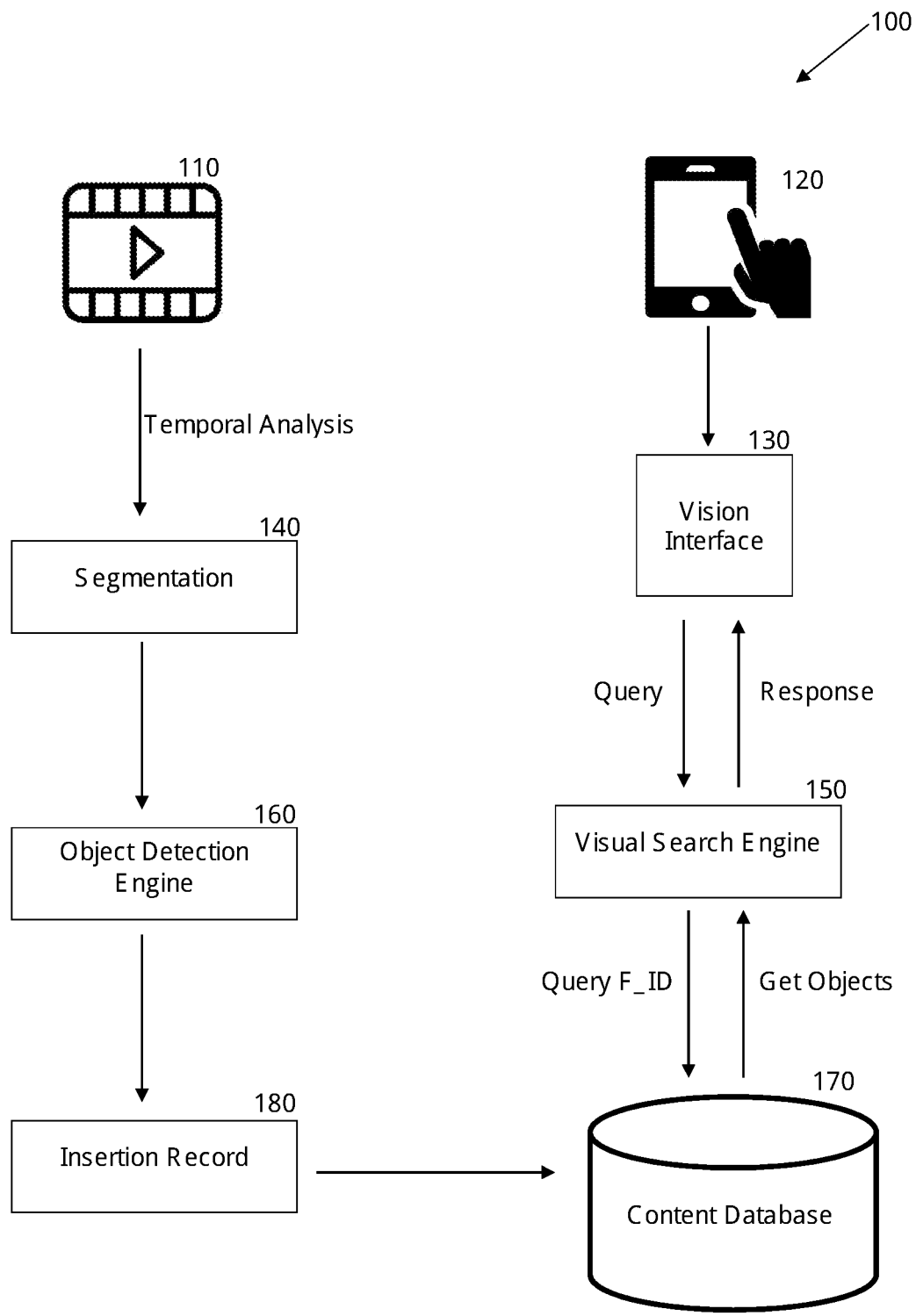
FIG. 1 depicts the overall process flow of one embodiment of the invention.

Reference in this specification to "one embodiment/aspect" or "an embodiment/aspect" means that a particular feature, structure, or characteristic described in connection with the embodiment/aspect is included in at least one embodiment/aspect of the disclosure. The use of the phrase "in one embodiment/aspect" or "in another embodiment/aspect" in various places in the specification are not necessarily all referring to the same embodiment/aspect, nor are separate or alternative embodiments/aspects mutually exclusive of other embodiments/aspects. Moreover, various features are described which may be exhibited by some embodiments/aspects and not by others. Similarly, various requirements are described which may be requirements for some embodiments/aspects but not other embodiments/aspects. Embodiment and aspect can be in certain instances be used interchangeably.

The terms used in this specification generally have their ordinary meanings in the art, within the context of the disclosure, and in the specific context where each term is used. Certain terms that are used to describe the disclosure are discussed below, or elsewhere in the specification, to provide additional guidance to the practitioner regarding the description of the disclosure. For convenience, certain terms may be highlighted, for example using italics and/or quotation marks. The use of highlighting has no influence on the scope and meaning of a term; the scope and meaning of a term is the same, in the same context, whether or not it is highlighted. It will be appreciated that the same thing can be said in more than one way.

Consequently, alternative language and synonyms may be used for any one or more of the terms discussed herein. Nor is any special significance to be placed upon whether or not a term is elaborated or discussed herein. Synonyms for certain terms are provided. A recital of one or more synonyms does not exclude the use of other synonyms. The use of examples anywhere in this specification including examples of any terms discussed herein is illustrative only, and is not intended to further limit the scope and meaning of the disclosure or of any exemplified term. Likewise, the disclosure is not limited to various embodiments given in this specification.

Without intent to further limit the scope of the disclosure, examples of instruments, apparatus, methods and their related results according to the embodiments of the present disclosure are given below. Note that titles or subtitles may be used in the examples for convenience of a reader, which in no way should limit the scope of the disclosure. Unless otherwise defined, all technical and scientific terms used herein have the same meaning as commonly understood by one of ordinary skill in the art to which this disclosure pertains. In the case of conflict, the present document, including definitions, will control.

The term "app" or "application" refers to a self-contained program or piece of software designed to fulfil a particular purpose, especially as downloaded onto a mobile device.

The term "Bag of Words" or "BoW model" refers to image classification, by treating image features as words. In document classification, a bag of words is a sparse vector of occurrence counts of words; that is, a sparse histogram over the vocabulary. In computer vision, a bag of visual words is a vector of occurrence counts of a vocabulary of local image features.

The term "cookie," "internet cookie" or "HTTP cookie" refers to a small piece of data sent from a website and stored on a user's computer by a user's web browser. Cookies are sent back and forth between an internet server and the browser which allows a user to be identified or to track his/her progressions. Cookies provide detail on what pages a consumer visits, the amount of time spent viewing each page, the links clicked, searches and interactions made. From this information, the cookie issuer gathers an understanding of the user's browsing tendencies and interests generating a profile. Analysing the profile, advertisers are able to create defined audience segments based upon users with similar returned similar information, hence profiles.

The term "clustering" or "cluster analysis" refers to the task of grouping a set of objects in such a way that objects in the same group (called a cluster) are more similar (in some sense or another) to each other than to those in other groups (clusters). It is a main task of exploratory data mining, and a common technique for statistical data analysis, used in many fields, including machine learning, pattern recognition, image analysis, information retrieval, bioinformatics, data compression, and computer graphics.

The term "data augmentation" refers to increasing the number of data points. In terms of images, it may mean that increasing the number of images in the dataset. In terms of traditional row/column format data, it means increasing the number of rows or objects.

The term "deep learning" refers to the application to learning tasks of artificial neural networks (ANNs) that contain more than one hidden layer. Deep learning is part of a broader family of machine learning methods based on learning data representations, as opposed to task specific algorithms.

The term "feature vector," in pattern recognition and machine learning, refers to a feature vector is an n-dimensional vector of numerical features that represent some object. Many algorithms in machine learning require a numerical representation of objects, since such representations facilitate processing and statistical analysis. When representing images, the feature values might correspond to the pixels of an image, when representing texts perhaps term occurrence frequencies.

The term "imbalanced data sets" refers to a special case for classification problem where the class distribution is not uniform among the classes. Typically, they are composed by two classes: The majority (negative) class and the minority (positive) class. Class balancing may be necessary to put the data in a usable form.

The term "inverted index," "postings file" or "inverted file" is an index data structure storing a mapping from content, such as words or numbers, to its locations in a database file, or in a document or a set of documents (named in contrast to a Forward Index, which maps from documents to content). The purpose of an inverted index is to allow fast full text searches, at a cost of increased processing when a document is added to the database.

The term "k-Nearest Neighbor" or "k-N N" refers to a nearest-neighbor classification object, where both distance metric ("nearest") and number of neighbors can be altered. The object classifies new observations using the predict method. The object contains the data used for training, so can compute re-substitution predictions.

Link Analysis

The term "module" refers to a self-contained unit, such as an assembly of electronic components and associated wiring or a segment of computer software, which itself performs a defined task and can be linked with other such units to form a larger system.

The term "Multilayer Perception Neural Network" or "MLP" refers to a feedforward neural network with one or more layers between input and output layers. Feedforward means that data flows in one direction from input to output layer (forward). MLPs are widely used for pattern classification, recognition, prediction and approximation. Multi-Layer Perceptron can solve problems which are not linearly separable.

The term "metadata" refers to data that describes other data. It provides information about a certain item's content. An image may include metadata that describes how large the picture is, the color depth, the image resolution and when the image was created. A text document's metadata may contain information about how long the document is, who the author is, when the document was written, and a short summary of the document.

The term "metatag" refers to metadata that is included on web pages. Description and keywords meta tags are commonly used to describe the Web page's content. Most search engines use this data when adding pages to their search index.

The term "QR code" or "Quick Response Code" refers to a matrix barcode (or two-dimensional barcode) that contains information about the item to which it is attached. A QR code includes black squares arranged in a square grid on a white background, which can be read by an imaging device such as a camera, and processed using Reed-Solomon error correction until the image can be appropriately interpreted. The required data is then extracted from patterns that are present in both horizontal and vertical components of the image.

The term "synthetic data" refers to any production data applicable to a given situation that are not obtained by direct measurement.

The term "Support Vector Machine" or "SVM" refers to supervised learning models with associated learning algorithms that analyze data used for classification and regression analysis. Given a set of training examples, each marked as belonging to one or the other of two categories, an SVM training algorithm builds a model that assigns new examples to one category or the other, making it a non-probabilistic binary linear classifier.

The term "targeted advertising" refers to a form of advertising where online advertisers can use sophisticated methods to target the most receptive audiences with certain traits, based on the product or person the advertiser is promoting. These traits can either be demographic which are focused on race, economic status, sex, age, the level of education, income level and employment or they can be psychographic focused which are based on the consumer's values, personality, attitudes, opinions, lifestyles and interests. They can also be behavioral variables, such as browser history, purchase history, and other recent activity.

The terms "visual words" or "visual word clusters" as used in image retrieval systems, refer to small parts of an image which carry some kind of information related to the features (such as the color, shape or texture), or changes occurring in the pixels such as the filtering, low-level feature descriptors (SIFT, SURF, . . . etc.).

The term "whitening transformation" or "sphering transformation" refers to a linear transformation that transforms a vector of random variables with a known covariance matrix into a set of new variables whose covariance is the identity matrix meaning that they are uncorrelated and all have variance 1. The transformation is called "whitening" because it changes the input vector into a white noise vector.

Other technical terms used herein have their ordinary meaning in the art that they are used, as exemplified by a variety of technical dictionaries.

Description of Preferred Embodiments

The particular values and configurations discussed in these non-limiting examples can be varied and are cited merely to illustrate at least one embodiment and are not intended to limit the scope thereof.

One of the major benefits of visual search (as opposed to traditional text based search) for demographic profiling is the inherently greater information about the query that can be ascertained. For example, a user may search for brown shoes in a search engine (or e-commerce website). The user may then choose to purchase or enquire about a very specific kind of brown shoe (loafers, with laces, etc.).

With access only to a text search query, it is impossible to extract greater granularity about the search object without any further information. However, with a visual search use-case, the query image itself can tell us a lot more about the nature of the user's query.

In order to extract metadata about a visual search query, advanced classification algorithms, including but not limited to Deep Learning, Supervised Learning and Unsupervised Learning can be employed. Thus, from an input image, a list of descriptive metadata can be obtained (e.g. shoe, brown, laces, brogue, context, location of manufacture, material and any such information that provides clarity as to the status of the contents within the image).

In one embodiment of the invention described here, a list of objects that compose an image can be extracted from a frame, linked to a sequence of frames that are analyzed to correspond to a semantically distinct "topic."

FIG. 1 depicts the overall process flow of the invention. Content from video 110 is collected and compiled to build a content database 170. A viewer of video may access the content database 170 through a query 120 by, for example, submitting a screenshot from a video to the system.

A video file 110 is processed to automatically determine and extract metadata and attributes pertaining to objects within a frame, or semantically similar group of frames. Temporal analysis (described below) includes segmentation 140 of the video. In the Object Detection Engine 160, a keyframe can be analyzed for objects. An insertion record 180 is created to account for the temporal location of the objects. Identified objects and identifying information are added to the content database 170.

A user can query a frame 120 by taking an image of a video using the Vision Interface 130. The system includes a Visual Search Engine 150 that can access the Content Database 170.

Temporal Analysis

Figure 2:
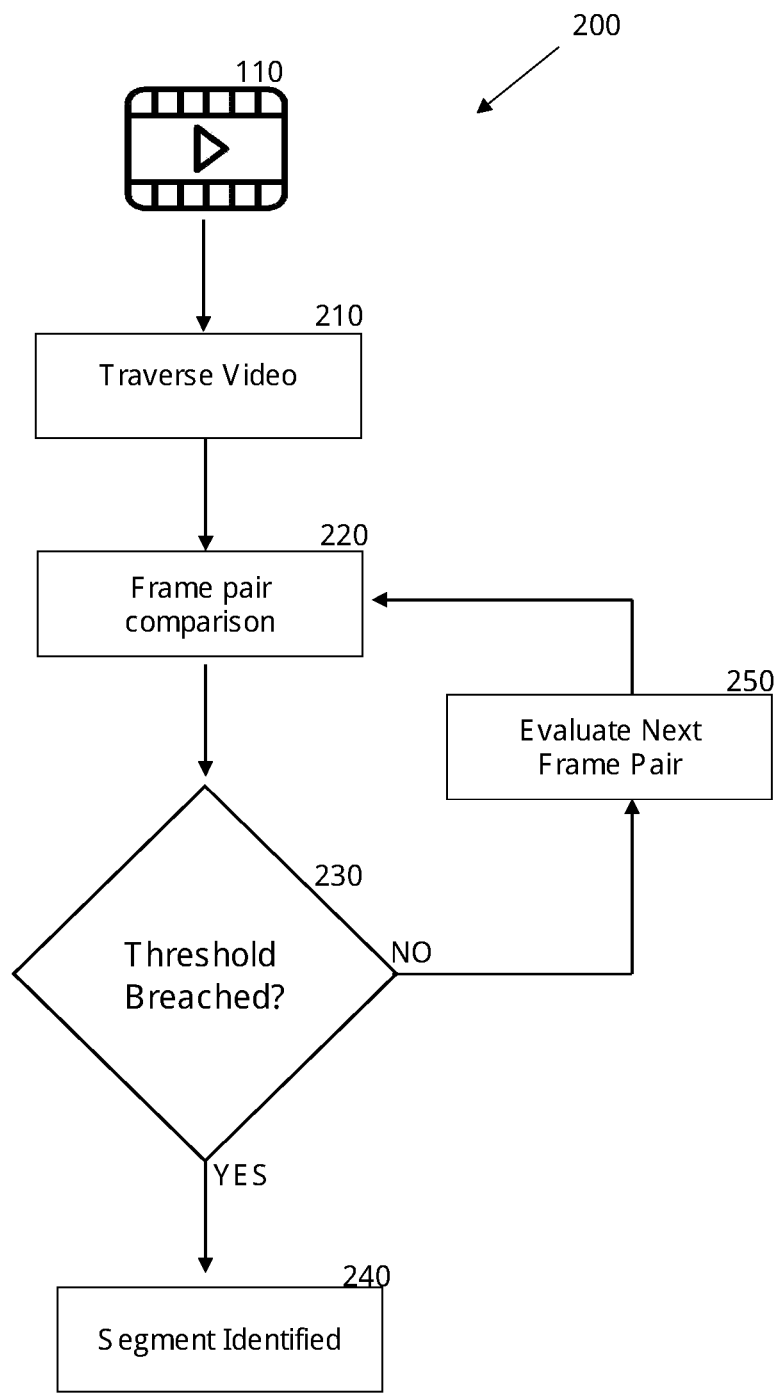
FIG. 2 depicts the video scene segmentation.

The steps involved in Temporal Analysis 200 are depicted in FIG. 2. A video 110 is introduced into the framework and the temporal frame sequence is analyzed to segment the media content. The aim of this segmentation is identify, isolate and tag frame sequences such that each segment corresponds to a single event or topic. Thereafter, the segments can be analyzed for objects.

The video 110 is traversed sequentially 210 to detect a pair, or sequence, of frames which breach a similarity threshold. That is, a frame comparison 220 can indicate a significant change in frame composition, implying a change of scene or topic.

Frames that depict the same events/scenes will not breach a similarity threshold. In this case, the next frame pair will be evaluated 250. Frames that depict different events/scenes will usually breach a similarity threshold, in which case, the segment will be identified 240 as an event/scene. This process can be repeated so that each frame in the video 110 is included in a segment. Thereafter, the object detection engine 160 can analyze segments of video for objects.

The significance of the segmentation is enhanced when dealing with objects which may exhibit temporal polymorphism (i.e. change their shape across frames). Once the identification of scenes or sequence of frames within a video is complete, it is possible to link objects which may morph into unknown shapes from a detected key frame. An alternative embodiment is to train the object detection model with examples of all known shape deformations for a particular object.

Metadata can be linked to the visual content of the frame itself by a segment identifier and the data can be ingested into a parallel visual search database. When a user queries an image of an ingested frame, it can be sent to the matching server. The segment identifier can be used to identify the frame sequence that the frame is associated with. This information is used to retrieve the list of objects and any linked augmented content for aforementioned objects to be passed back to the user 120. Note that the query frame itself is not analyzed for objects. Rather, it is matched to a segment identifier which links to a pre-analyzed object corpus for the segment.

Object Detection

A key frame identified through temporal analysis can be analyzed to recognize and identify individual objects. In one embodiment, a deep convolutional neural network (CNN) comprised of multiple layers can be used to perform this task.

Figure 3:
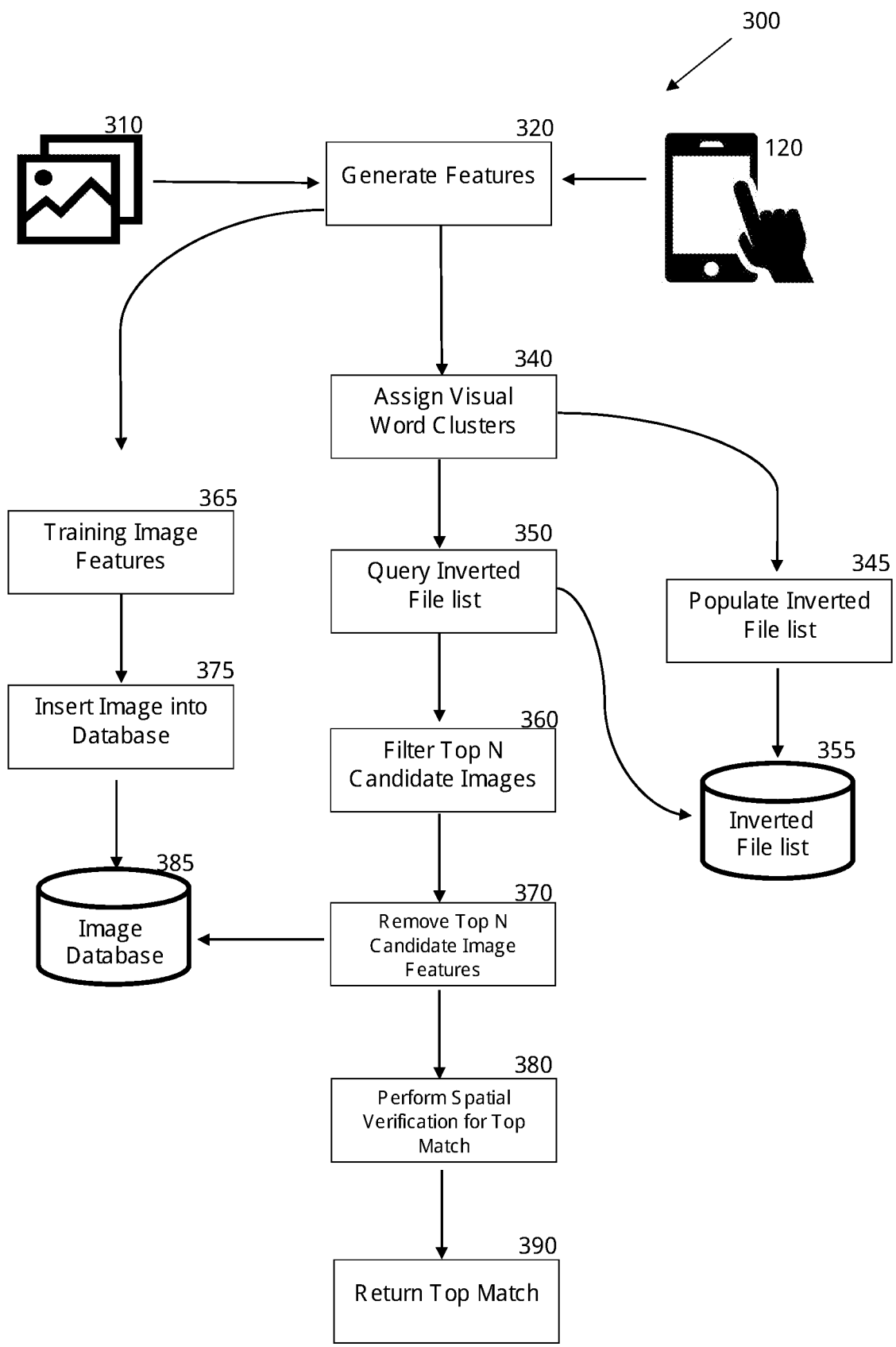
FIG. 3 depicts the visual search overview.

FIG. 3 depicts how a visual search engine based on a "bag of visual words" approach can be utilized to search for segment identifiers from a visual query image. The search engine uses an image database 385. Training images 310 (i.e. images with known features) are submitted with defined objects. The images are used to generate features 320. The training images 365 can be inserted into the database 375.

In order to train the CNN model, it is necessary to introduce a significant number of image examples for each object to be ingested. A vast corpus of image data can be organized for multiple objects with multiple attributes and their locations. This data is further subjected to whitening transformation, data augmentation and class balancing. This database of objects is used as an input for training the deep convolutional net.

The model can be trained so that objects and their attributes are learned together. Furthermore, the model provides values from hidden layers which is a real valued vector description of the images across various semantic abstractions. An inference of the model can provide the object labels, confidence score, hidden layer vectors and attributes.

For example, objects can be an item in the apparel domain (bag, jeans, etc.) along with their attributes (color, pattern, length etc.). Additionally, the inference on the image over multiple areas the location of the object and can be used to ascertain the most likely location of the image in frames before or after each key frame.

Once the model is evaluated to reach a successfully trained state (evaluated on meeting a minimum error metrics for a test set), it is propagated to the live ingestion module within the framework. After temporal analysis of a video segment, each key frame is analyzed to obtain the location of the objects present in the image. Every object detected in that frame can be tracked temporally in both directions within the segment. For each location found in the segment, an inference of labels, attributes and inner layers can be performed and averaged temporally weighted by a confidence measure. This culminates in the generation of an object-wise feature vector for each segment and/or frame. The vector descriptions generated by the hidden layers can often be comprised of high dimensionality. A large number of images can be collected in order to learn a compression technique for that particular distribution. In the exemplary embodiment of the framework described here, deep autoencoders provide the best compression with the least loss for search accuracy.

Visual Search

When a user wishes to interact with a particular video, the/she can indicate their interest by capturing a frame with their mobile device camera, from within a computer program typically operating on a user's mobile device, referred to as an "App." The App can upload the query image for further processing.

After a visual query image is sent to the server from a user's device, it is used to search through the known image database to identify possible matches. The top ranking result is then used to further identify which segment the frame in question is most associated with. Thereafter, the segment identifier can be used to retrieve objects linked with that particular segment. After a query response has been aggregated, all of the augmented content is relayed back to the user's mobile device.

For example, a viewer can submit a query of a handbag that he/she noticed in a video. The handbag can be matched with images in the database based on several criteria, including its shape, pattern, brand, shape, size, brand and other details. The system can return a number of matched images that are ranked.

This process is depicted in FIG. 3 where a user queries an image 120. Visual word clusters are assigned 340. From the visual word clusters, an inverted file list is populated. The inverted file list is queried 350 and stored 355. The top candidate images are filtered 360 which can be added to the image database 385. Spatial verification can be performed for top matches 380 and the top matches can be returned to the viewer 390.

Offline Data Augmentation

Figure 4:
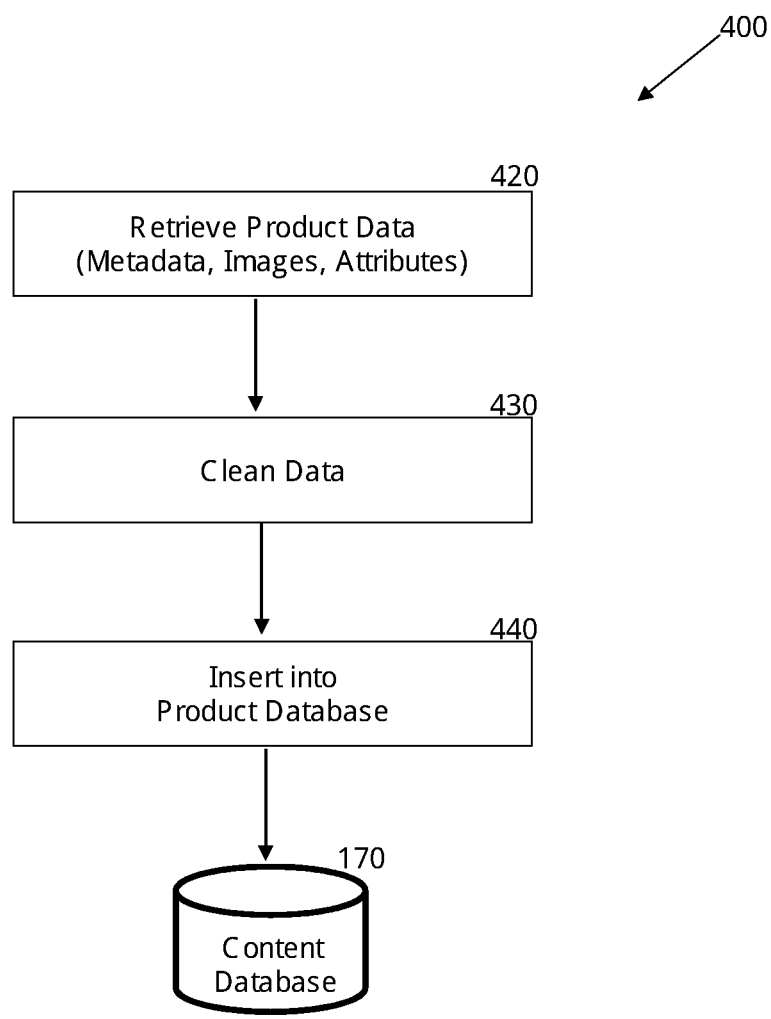
FIG. 4 depicts the offline product data augmentation.

Images that are not defined, such as those obtained by a web crawler can also be utilized to populate the content database. FIG. 4 depicts the offline product data augmentation 400. In an exemplary framework, offline data augmentation is used to populate a database of objects and associated metadata 170.

A crawling process can be utilized to retrieve images and their annotated metadata from a variety of online sources (e.g. product listings from e commerce platforms or images from social media networks) 420. These crawled image and metadata attributes are passed through a data cleaning stage 430 which transforms the raw, crawled data into records which are suitable for insertion into a database 440.

The database insertion format can link each crawled image record to an object identifier. This enables linking objects detected from segments to objects in the product database, thus providing an interface to provide the augmented data for an object, or group of objects identified from a visual query image.

Use Cases

Product Recommendation

The invention can be used to power a second screen content augmentation service for existing visual media content.

For example, popular television shows (or movies) can be ingested into the platform to analyze the product portfolio accessible via each medium. Viewers can be prompted, or made aware, of possible interaction mechanisms which can take place during, or after, the show is aired (or streamed in the case of online video delivery).

Any user visual queries for frames from ingested videos can be subsequently enriched by the object detection framework. This provides a unique platform for content creators as well as consumers to interact with products/services that are offered. The scope of objects detected within the framework can encompass inanimate items within the frame (clothing items, furniture, travel opportunities etc.), or extend to entities detected or corresponding to entities within the segments (i.e actors, casting crew etc.).

For example, an advertiser or retailer can use product placement to promote a handbag in a video or film. A viewer submits a query of a scene that includes the handbag. A promotional advertisement for the matched product (i.e. the handbag) can be played on the user's device. Additional information, including purchasing instructions can also be provided to the viewer.

Figure 5:
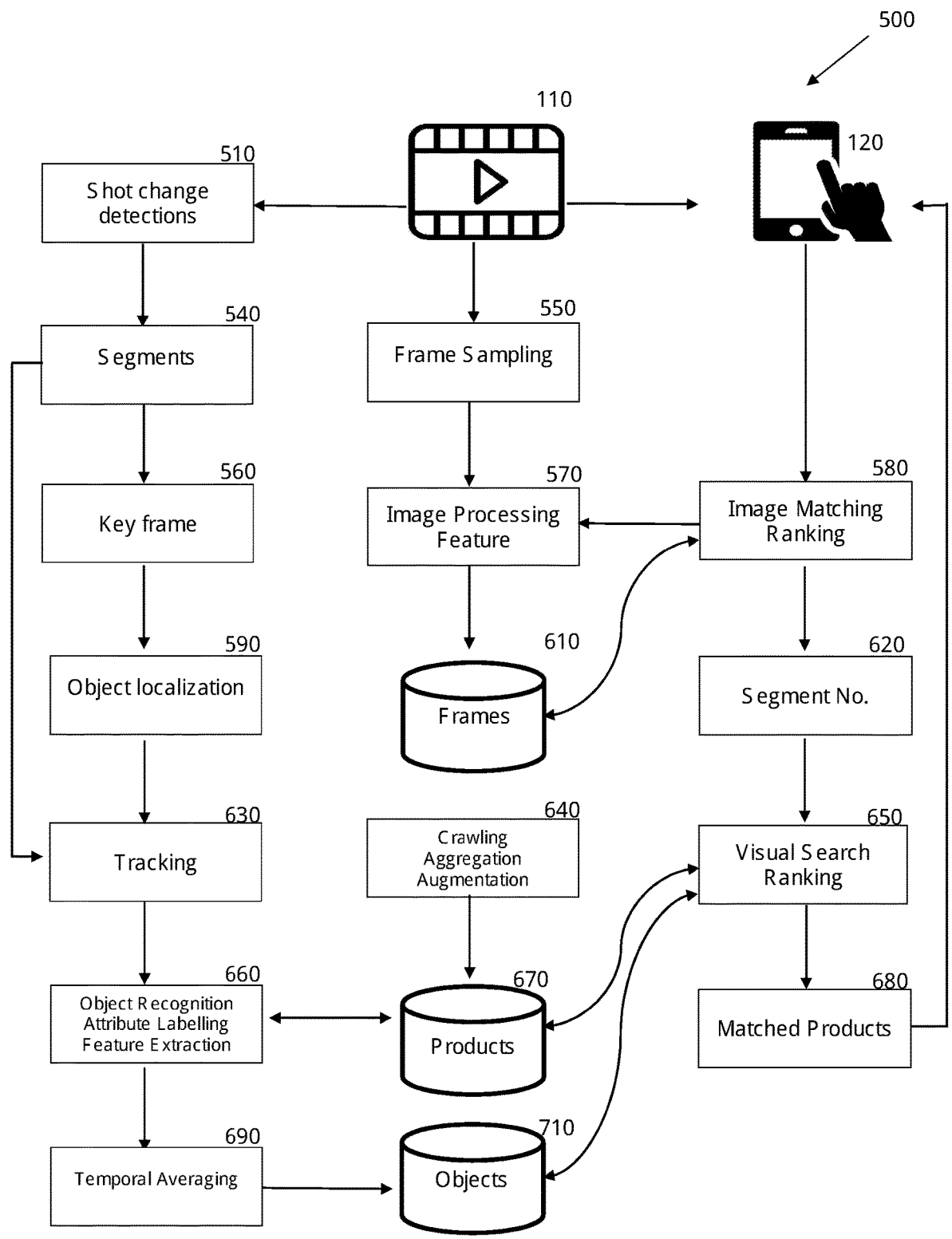
FIG. 5 depicts the product recommendation framework for offline pre-ingested content.

FIG. 5 depicts an exemplary framework to handle the use-case described here. Video 110 can be used to augment the content database through offline ingestion. The video undergoes shot change detection 510. Segments of the video 540 are identified by key frames 560, object localization 590 and tracking 630. The next step is object recognition, attribute labelling and feature extraction 660 followed by temporal averaging 690.

Video ingestion can also include frame sampling 550 and an image processing feature 570. Database content can include frames 610, products 670 and objects 710. Product ingestion (web crawling, aggregation and augmentation) occurs at 640.

A user can query a frame 120. The image is matched by ranking it with those in the database that are similar 580. A segment number can be generated 620 as well as a visual search ranking 650. Matched products 680 can be relayed to the user in response to his/her query. Products that advertisers and/or marketers wish to promote, can get a higher visual search ranking 650.

Live TV Second Screen

In addition to offline, pre-existing content, it is also possible to extend this framework to handle live video streams. The challenge in such a scenario is to ensure that each frame that is propagated into the object detection platform completes the ingestion mechanism prior to any queries of the same frame.

To account for live video, the temporal analysis module can be replaced with a transactional content database that maintains a temporary history of the last "N" minutes (or hours if necessary). In this modified framework, every incoming frame from the live video stream is ingested into the object detection and visual search databases, with a "time-to-live" mechanism ensuring that the data expires after a configurable delay. In this manner, the size of the database (and the computing cluster) is tethered to a high performance state capable of maintaining low latency operations in volume.

Such a framework can be used to serve second screen content for:
  live sporting events, displaying athlete career and/or game statistics
  live news broadcasts, displaying info graphics for detected objects/locations in bulletins etc.
  telemarketing broadcasts, displaying price comparisons for detected products.

Use of the Invention for On-line Shopping

Figure 6:
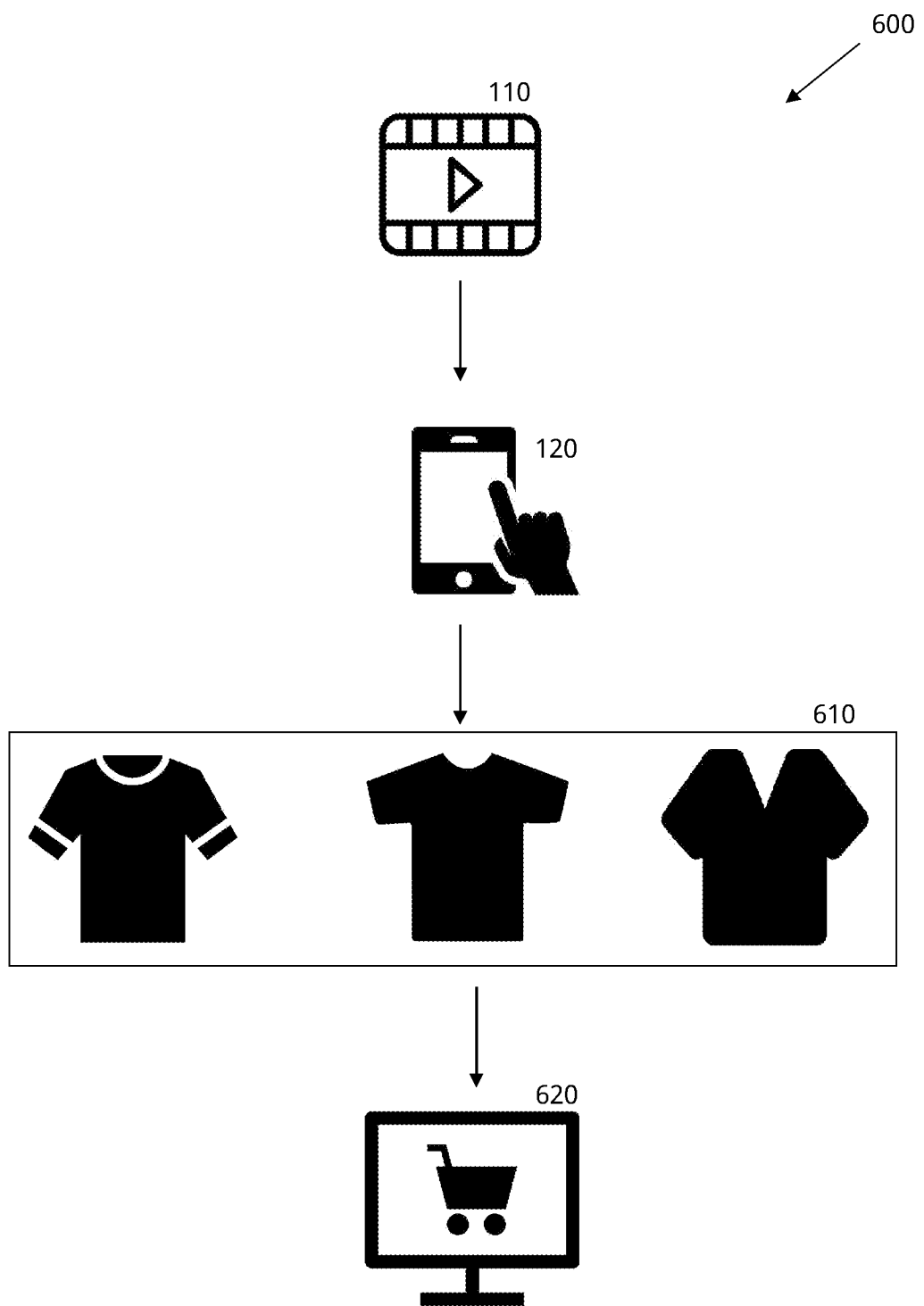
FIG. 6 depicts a user query and product recommendation.

As depicted in FIG. 6, the invention allows the viewer of video 110 to query a screen shot of a video for additional information on a product that he/she notices. In this example 600, a viewer watches a drama on a television. The viewer notices an actor wearing a particular shirt. The viewer can take a screen shot for submission into the system 120. For television viewing, he/she can take a photo of the screen using an App. If the viewer is streaming the video onto a phone, tablet or computer, he/she can take a screen shot for submission. Images of still photos (e.g. magazine advertisements) can also be submitted.

The system detects the objects in the screen shot. In this case, it detects a dark-colored shirt with short sleeves. Commercially available products that fit this criteria are displayed to the viewer 610. He/she can submit additional criteria to make the query more specific. For example, the object search can be further narrowed to include only a specific design (e.g. v-neck) or shirts from a particular designer.

Thereafter, the viewer can purchase the product on-line 620 through a participating vendor. This allows vendors to market products through product placement without requiring additional commercial time and/or advertisements.

The foregoing description discloses only exemplary embodiments of the invention. Modifications of the above disclosed apparatus and methods which fall within the scope of the invention will be readily apparent to those of ordinary skill in the art. Accordingly, while the present invention has been disclosed in connection with exemplary embodiments thereof, it should be understood that other embodiments may fall within the spirit and scope of the invention as defined by the following claims.

Operating Environment

The system is typically comprised of a central server that is connected by a data network to a user's computer. The central server may be comprised of one or more computers connected to one or more mass storage devices. The precise architecture of the central server does not limit the claimed invention. Further, the user's computer may be a laptop or desktop type of personal computer. It can also be a cell phone, smart phone or other handheld device, including a tablet. The precise form factor of the user's computer does not limit the claimed invention. Examples of well known computing systems, environments, and/or configurations that may be suitable for use with the invention include, but are not limited to, personal computers, server computers, hand held, laptop or mobile computer or communications devices such as cell phones and PDA's, multiprocessor systems, microprocessor-based systems, set top boxes, programmable consumer electronics, network PCs, minicomputers, mainframe computers, distributed computing environments that include any of the above systems or devices, and the like. The precise form factor of the user's computer does not limit the claimed invention. In one embodiment, the user's computer is omitted, and instead a separate computing functionality provided that works with the central server. In this case, a user would log into the server from another computer and access the system through a user environment.

The user environment may be housed in the central server or operatively connected to it. Further, the user may receive from and transmit data to the central server by means of the Internet, whereby the user accesses an account using an Internet web-browser and browser displays an interactive web page operatively connected to the central server. The central server transmits and receives data in response to data and commands transmitted from the browser in response to the customer's actuation of the browser user interface. Some steps of the invention may be performed on the user's computer and interim results transmitted to a server. These interim results may be processed at the server and final results passed back to the user.

The method described herein can be executed on a computer system, generally comprised of a central processing unit (CPU) that is operatively connected to a memory device, data input and output circuitry (I/O) and computer data network communication circuitry. Computer code executed by the CPU can take data received by the data communication circuitry and store it in the memory device. In addition, the CPU can take data from the I/O circuitry and store it in the memory device. Further, the CPU can take data from a memory device and output it through the I/O circuitry or the data communication circuitry. The data stored in memory may be further recalled from the memory device, further processed or modified by the CPU in the manner described herein and restored in the same memory device or a different memory device operatively connected to the CPU including by means of the data network circuitry. The memory device can be any kind of data storage circuit or magnetic storage or optical device, including a hard disk, optical disk or solid state memory. The I/O devices can include a display screen, loudspeakers, microphone and a movable mouse that indicate to the computer the relative location of a cursor position on the display and one or more buttons that can be actuated to indicate a command.

The computer can display on the display screen operatively connected to the I/O circuitry the appearance of a user interface. Various shapes, text and other graphical forms are displayed on the screen as a result of the computer generating data that causes the pixels comprising the display screen customer's actuation of the browser user interface. Some steps of the invention may be performed on the user's computer and interim results transmitted to a server. These interim results may be processed at the server and final results passed back to the user.

The computer can display on the display screen operatively connected to the I/O circuitry the appearance of a user interface. Various shapes, text and other graphical forms are displayed on the screen as a result of the computer generating data that causes the pixels comprising the display screen to take on various colors and shades. The user interface also displays a graphical object referred to in the art as a cursor. The object's location on the display indicates to the user a selection of another object on the screen. The cursor may be moved by the user by means of another device connected by I/O circuitry to the computer. This device detects certain physical motions of the user, for example, the position of the hand on a flat surface or the position of a finger on a flat surface. Such devices may be referred to in the art as a mouse or a track pad. In some embodiments, the display screen itself can act as a trackpad by sensing the presence and position of one or more fingers on the surface of the display screen. When the cursor is located over a graphical object that appears to be a button or switch, the user can actuate the button or switch by engaging a physical switch on the mouse or trackpad or computer device or tapping the trackpad or touch sensitive display. When the computer detects that the physical switch has been engaged (or that the tapping of the track pad or touch sensitive screen has occurred), it takes the apparent location of the cursor (or in the case of a touch sensitive screen, the detected position of the finger) on the screen and executes the process associated with that location. As an example, not intended to limit the breadth of the disclosed invention, a graphical object that appears to be a 2 dimensional box with the word "enter" within it may be displayed on the screen. If the computer detects that the switch has been engaged while the cursor location (or finger location for a touch sensitive screen) was within the boundaries of a graphical object, for example, the displayed box, the computer will execute the process associated with the "enter" command. In this way, graphical objects on the screen create a user interface that permits the user to control the processes operating on the computer.

The invention may also be entirely executed on one or more servers. A server may be a computer comprised of a central processing unit with a mass storage device and a network connection. In addition a server can include multiple of such computers connected together with a data network or other data transfer connection, or, multiple computers on a network with network accessed storage, in a manner that provides such functionality as a group. Practitioners of ordinary skill will recognize that functions that are accomplished on one server may be partitioned and accomplished on multiple servers that are operatively connected by a computer network by means of appropriate inter process communication. In addition, the access of the website can be by means of an Internet browser accessing a secure or public page or by means of a client program running on a local computer that is connected over a computer network to the server. A data message and data upload or download can be delivered over the Internet using typical protocols, including TCP/IP, HTTP, TCP, UDP, SMTP, RPC, FTP or other kinds of data communication protocols that permit processes running on two remote computers to exchange information by means of digital network communication. As a result a data message can be a data packet transmitted from or received by a computer containing a destination network address, a destination process or application identifier, and data values that can be parsed at the destination computer located at the destination network address by the destination application in order that the relevant data values are extracted and used by the destination application. The precise architecture of the central server does not limit the claimed invention. In addition, the data network may operate with several levels, such that the user's computer is connected through a fire wall to one server, which routes communications to another server that executes the disclosed methods.

The user computer can operate a program that receives from a remote server a data file that is passed to a program that interprets the data in the data file and commands the display device to present particular text, images, video, audio and other objects. The program can detect the relative location of the cursor when the mouse button is actuated, and interpret a command to be executed based on location on the indicated relative location on the display when the button was pressed. The data file may be an HTML document, the program a web-browser program and the command a hyperlink that causes the browser to request a new HTML document from another remote data network address location. The HTML can also have references that result in other code modules being called up and executed, for example, Flash or other native code.

Those skilled in the relevant art will appreciate that the invention can be practiced with other communications, data processing, or computer system configurations, including: wireless devices, Internet appliances, hand-held devices (including personal digital assistants (PDAs)), wearable computers, all manner of cellular or mobile phones, multi-processor systems, microprocessor-based or programmable consumer electronics, set-top boxes, network PCs, mini-computers, mainframe computers, and the like. Indeed, the terms "computer," "server," and the like are used interchangeably herein, and may refer to any of the above devices and systems.

In some instances, especially where the user computer is a mobile computing device used to access data through the network the network may be any type of cellular, IP-based or converged telecommunications network, including but not limited to Global System for Mobile Communications (GSM), Time Division Multiple Access (TDMA), Code Division Multiple Access (CDMA), Orthogonal Frequency Division Multiple Access (OFDM), General Packet Radio Service (GPRS), Enhanced Data GSM Environment (EDGE), Advanced Mobile Phone System (AMPS), Worldwide Interoperability for Microwave Access (WiMAX), Universal Mobile Telecommunications System (UMTS), Evolution-Data Optimized (EVDO), Long Term Evolution (LTE), Ultra Mobile Broadband (UMB), Voice over Internet Protocol (VoIP), or Unlicensed Mobile Access (UMA).

The Internet is a computer network that permits customers operating a personal computer to interact with computer servers located remotely and to view content that is delivered from the servers to the personal computer as data files over the network. In one kind of protocol, the servers present webpages that are rendered on the customer's personal computer using a local program known as a browser. The browser receives one or more data files from the server that are displayed on the customer's personal computer screen. The browser seeks those data files from a specific address, which is represented by an alphanumeric string called a Universal Resource Locator (URL). However, the webpage may contain components that are downloaded from a variety of URL's or IP addresses. A website is a collection of related URL's, typically all sharing the same root address or under the control of some entity. In one embodiment different regions of the simulated space have different URL's. That is, the simulated space can be a unitary data structure, but different URL's reference different locations in the data structure. This makes it possible to simulate a large area and have participants begin to use it within their virtual neighborhood.

Computer program logic implementing all or part of the functionality previously described herein may be embodied in various forms, including, but in no way limited to, a source code form, a computer executable form, and various intermediate forms (e.g., forms generated by an assembler, compiler, linker, or locator.) Source code may include a series of computer program instructions implemented in any of various programming languages (e.g., an object code, an assembly language, or a high-level language such as C, C-HF, C#, Action Script, PHP, EcmaScript, JavaScript, JAVA, or 5 HTML) for use with various operating systems or operating environments. The source code may define and use various data structures and communication messages. The source code may be in a computer executable form (e.g., via an interpreter), or the source code may be converted (e.g., via a translator, assembler, or compiler) into a computer executable form.

The invention may be described in the general context of computer-executable instructions, such as program modules, being executed by a computer. Generally, program modules include routines, programs, objects, components, data structures, etc., that perform particular tasks or implement particular abstract data types. The computer program and data may be fixed in any form (e.g., source code form, computer executable form, or an intermediate form) either permanently or transitorily in a tangible storage medium, such as a semiconductor memory device (e.g., a RAM, ROM, PROM, EEPROM, or Flash-Programmable RAM), a magnetic memory device (e.g., a diskette or fixed hard disk), an optical memory device (e.g., a CD-ROM or DVD), a PC card (e.g., PCMCIA card), or other memory device. The computer program and data may be fixed in any form in a signal that is transmittable to a computer using any of various communication technologies, including, but in no way limited to, analog technologies, digital technologies, optical technologies, wireless technologies, networking technologies, and internetworking technologies. The computer program and data may be distributed in any form as a removable storage medium with accompanying printed or electronic documentation (e.g., shrink wrapped software or a magnetic tape), preloaded with a computer system (e.g., on system ROM or fixed disk), or distributed from a server or electronic bulletin board over the communication system (e.g., the Internet or World Wide Web.) It is appreciated that any of the software components of the present invention may, if desired, be implemented in ROM (read-only memory) form. The software components may, generally, be implemented in hardware, if desired, using conventional techniques.

The invention may also be practiced in distributed computing environments where tasks are performed by remote processing devices that are linked through a communications network. In a distributed computing environment, program modules may be located in both local and remote computer storage media including memory storage devices. Practitioners of ordinary skill will recognize that the invention may be executed on one or more computer processors that are linked using a data network, including, for example, the Internet. In another embodiment, different steps of the process can be executed by one or more computers and storage devices geographically separated but connected by a data network in a manner so that they operate together to execute the process steps. In one embodiment, a user's computer can run an application that causes the user's computer to transmit a stream of one or more data packets across a data network to a second computer, referred to here as a server. The server, in turn, may be connected to one or more mass data storage devices where the database is stored. The server can execute a program that receives the transmitted packet and interpret the transmitted data packets in order to extract database query information. The server can then execute the remaining steps of the invention by means of accessing the mass storage devices to derive the desired result of the query. Alternatively, the server can transmit the query information to another computer that is connected to the mass storage devices, and that computer can execute the invention to derive the desired result. The result can then be transmitted back to the user's computer by means of another stream of one or more data packets appropriately addressed to the user's computer. In one embodiment, the relational database may be housed in one or more operatively connected servers operatively connected to computer memory, for example, disk drives. In yet another embodiment, the initialization of the relational database may be prepared on the set of servers and the interaction with the user's computer occur at a different place in the overall process.

It should be noted that the flow diagrams are used herein to demonstrate various aspects of the invention, and should not be construed to limit the present invention to any particular logic flow or logic implementation. The described logic may be partitioned into different logic blocks (e.g., programs, modules, functions, or subroutines) without changing the overall results or otherwise departing from the true scope of the invention. Oftentimes, logic elements may be added, modified, omitted, performed in a different order, or implemented using different logic constructs (e.g., logic gates, looping primitives, conditional logic, and other logic constructs) without changing the overall results or otherwise departing from the true scope of the invention.

The described embodiments of the invention are intended to be exemplary and numerous variations and modifications will be apparent to those skilled in the art. All such variations and modifications are intended to be within the scope of the present invention as defined in the appended claims. Although the present invention has been described and illustrated in detail, it is to be clearly understood that the same is by way of illustration and example only, and is not to be taken by way of limitation. It is appreciated that various features of the invention which are, for clarity, described in the context of separate embodiments may also be provided in combination in a single embodiment.

What is claimed is:

1. A method of detecting an object in video and matching the object to one or more products comprising the steps of:
   a) obtaining video and automatically extracting metadata and attributes of objects in frames and/or portions of frames in the video;
   b) segmenting the video based on depicted settings and/or events by comparing contents of consecutive frames for similarities and differences, wherein the video is traversed sequentially to detect a pair of frames or sequence of frames which breach a similarity threshold, wherein a key frame is identified for each segment;
   c) compiling segments of same or similar settings and/or events, wherein each segment is tagged with a segment identifier;
   d) analysing one or more segments to detect one or more objects, wherein frames and/or portions of frames are compared with defined content in a database populated by aligning known objects and metadata clusters, wherein the metadata is linked to the frames and/or portions of frames by the segment identifier, wherein the location of the detected one or more objects are obtained in each key frame, wherein an object-wise feature vector is generated for each segment;
e) comparing the one or more objects to products;
f) identifying products associated with the one or more objects, wherein a convolutional neural network (CNN) is used;
g) notifying one or more viewers of the products; wherein a second screen augmentation is used for live or streaming video.

2. The method of claim 1, wherein the database is populated with defined content using a web crawler.

3. The method of claim 1, wherein the step of notifying one or more viewers of the products includes displaying an advertisement.

4. The method of claim 1, wherein the step of notifying one or more viewers of the products includes providing a hyperlink to a website or video.

5. A method of detecting one or more objects in a digital screen shot from a video and matching the one or more objects to promotional material comprising the steps of:
a) receiving an inquiry from a viewer in the form of a digital screen shot;
b) identifying one or more objects in the digital screen shot by comparing the digital screen shot and/or portions of the digital screen shot with defined content in a database populated by aligning known objects and metadata clusters, wherein the digital screen shot is matched with a segment identifier from the video to retrieve a list of objects linked with a segment of the video, wherein a bag of visual words approach is used and top N candidate images are filtered and added to the database;
c) comparing the one or more objects to products;
d) matching products associated with the one or more objects, wherein a convolutional neural network (CNN) is used, wherein spatial verification is performed on the matching products for verification; and
e) contacting the viewer with promotional material related to matched products;
wherein after receiving the inquiry, visual word clusters are assigned.

6. The method of claim 5, wherein the database is populated with defined content using a web crawler.

7. The method of claim 5, wherein second screen content augmentation is used for live or streaming video.

8. The method of claim 5, wherein the step of contacting the viewer with promotional material related to the identified products includes displaying an advertisement and/or providing a hyperlink to a website or video.

9. A system for generating relationships between objects in video to products in a database of products comprising:
a computerized network and system to be locally or remotely exposed to a user or groups of users via a user interface application;
a module for detecting and storing media content locally or on a server;
a module for transmitting the media content to a processor, remote or server-based, for ingestion of metadata and/or visual features;
a module for transmitting the media content to a processor, remote or server-based, for extraction of metadata and visual features;
a means for receiving input from one or more users in the form of a digital image derived from the video and that includes visual features;
a module configured to implement the following:
identify the visual features in the digital image and correlate the visual features with objects and/or groups of related products in the database, wherein the database is populated with defined content by aligning known objects and/or groups of related products and metadata clusters, wherein a bag of visual words approach is used to identify visual features and correlate the visual features with objects and/or groups of related products in the database;
wherein the digital image is matched with a segment identifier to retrieve a list of objects and/or groups of related products linked with a segment of the video; and
analyse visual features and metadata of the digital image to correlate the visual features with objects and/or groups of related products using a convolutional neural network (CNN), wherein spatial verification is performed on the matching objects and/or groups of related products for verification, and
a networked service that distributes information on the objects and/or groups of related products to a user and/or groups of users;
wherein after receiving the input, visual word clusters are assigned.

10. The system of claim 9, wherein the information on the objects and/or groups of related products includes advertisements.

11. The system of claim 9, wherein the information on the objects and/or groups of related products includes a hyperlink or content accessible through the internet.

* * * * *